United States Patent
Choi et al.

(10) Patent No.: US 9,005,313 B2
(45) Date of Patent: Apr. 14, 2015

(54) DEVICE FOR PREPARING BIO-OIL, SYSTEM FOR PREPARING BIO-OIL AND METHOD FOR PREPARING BIO-OIL USING THE SAME

(75) Inventors: Hang-Seok Choi, Daejeon (KR);
Yeon-Seok Choi, Daejeon (KR);
Seock-Joon Kim, Daejeon (KR);
Hun-Che Park, Daejeon (KR);
So-Young Han, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 393 days.

(21) Appl. No.: 13/322,550

(22) PCT Filed: May 26, 2010

(86) PCT No.: PCT/KR2010/003308
§ 371 (c)(1),
(2), (4) Date: Nov. 26, 2011

(87) PCT Pub. No.: WO2010/137858
PCT Pub. Date: Dec. 2, 2010

(65) Prior Publication Data
US 2012/0066963 A1 Mar. 22, 2012

(30) Foreign Application Priority Data

May 26, 2009 (KR) .................. 10-2009-0045920

(51) Int. Cl.
*C10L 1/02* (2006.01)
*C10G 1/00* (2006.01)
(Continued)

(52) U.S. Cl.
CPC ............... *C10G 1/008* (2013.01); *C10B 49/18* (2013.01); *C10B 51/00* (2013.01); *C10B 53/02* (2013.01);
(Continued)

(58) Field of Classification Search
USPC ............ 44/307; 422/109, 119, 198, 187, 139, 422/145, 146; 202/96; 201/23; 48/76, 111, 48/209, 89; 585/240
See application file for complete search history.

(56) References Cited

U.S. PATENT DOCUMENTS

| 4,586,442 A | 5/1986 | Caughey |
| 5,792,340 A | 8/1998 | Freel et al. |

(Continued)

FOREIGN PATENT DOCUMENTS

| CN | 1325937 | 12/2001 |
| CN | 1844317 | 10/2006 |

(Continued)

OTHER PUBLICATIONS

Zhu et al. CN201125229Y—Oct. 2008.*

(Continued)

*Primary Examiner* — Prem C Singh
*Assistant Examiner* — Chantel Graham
(74) *Attorney, Agent, or Firm* — Lexyoume IP Meister, PLLC

(57) ABSTRACT

A device for preparing bio-oil, a system for preparing bio-oil and a method for preparing bio-oil using the same are provided. Biomass is supplied to an inclined portion of a reactor, and high-temperature hot sand is supplied to an upper side of the biomass supplied to the inclined portion. Then, a heater heats the inclined portion. Thus, the fast pyrolysis performance of the biomass can be enhanced, thereby increasing the yield of bio-oil. Also, combustion gas produced from the heater is supplied to the interior of the reactor, so that the interior of the reactor can be simply formed under a nonoxidizing atmosphere. Accordingly, the device for preparing bio-oil can be manufactured into a very simple structure.

6 Claims, 10 Drawing Sheets

(51) Int. Cl.
  *C10B 49/18* (2006.01)
  *C10B 51/00* (2006.01)
  *C10B 53/02* (2006.01)
  *C10C 5/00* (2006.01)
  *C10G 1/02* (2006.01)

(52) U.S. Cl.
  CPC ... *C10C 5/00* (2013.01); *C10G 1/02* (2013.01); *Y02E 50/14* (2013.01); *C10G 2300/1011* (2013.01)

(56) References Cited

U.S. PATENT DOCUMENTS

| | | | |
|---|---|---|---|
| 7,032,525 | B1 | 4/2006 | Edmondson |
| 2008/0006520 | A1* | 1/2008 | Badger et al. ............ 202/96 |
| 2008/0022592 | A1* | 1/2008 | Feldmann ............ 48/111 |

FOREIGN PATENT DOCUMENTS

| | | | |
|---|---|---|---|
| CN | 201125229 | | 10/2008 |
| CN | 201125229 Y | * | 10/2008 |
| JP | 06-212163 | | 8/1994 |
| JP | 2002-320998 | | 4/2001 |
| JP | 2004-010673 | | 6/2002 |
| KR | 10-2001-006225 | | 7/2001 |
| KR | 10-2001-0062259 | | 7/2001 |
| KR | 10-2005-0104324 | | 11/2005 |
| KR | 10-2006-0102778 | | 9/2006 |

OTHER PUBLICATIONS

Zhu et al. CN201125229Y BIB—Oct. 2008.*
Zhu et al. CN201125229Y Description—Oct. 2008.*
Korean Intellectual Property Office, International Search Report of PCT/KR2010/003308, Jan. 5, 2011.
E. G. Baker, "Assessment of Large Scale Biomass gasification systems for less developed countries", Final report to the US department of agriculture forest service under contract 2311104272, Sep. 1980, pp. 1-124.
Joon-Weon Choi, "Characterization of Bio-oils Produced by Fluidized Bed Type Fast Pyrolysis of Woody Biomass", Korea New and Renewable Energy Association, 2006 Fall Conference, pp. 474-477.
A.V. Bridgwater, "Fast Pyrolysis Processes for biomass", Bio-Energy Research Group, Aston University, Birmingham, B4 7 ET, UK pp. 1-73, 2000.
F. Michael Lewis, "Pyrogas from biomass" A Conference on Capturing the Sun Through Bioconversion Mar. 10-12, 1976 Washington, DC Shoreham Americana Hotel, pp. 1-17.
Sun-Hoon Lee, "Pyrolysis Reaction Characteristics of Biomass Fluodized Bed Reactor", Department of Environmental Eng. Kwangwoon University, pp. 1-8, 2005.

* cited by examiner

DEVICE FOR PREPARING BIO-OIL, SYSTEM FOR PREPARING BIO-OIL AND METHOD FOR PREPARING BIO-OIL USING THE SAME

TECHNICAL FIELD

The present invention relates to a device for preparing bio-oil, a system for preparing bio-oil and a method for preparing bio-oil using the same. More particularly, the present invention relates to a device for preparing bio-oil, a system for preparing bio-oil and a method for preparing bio-oil using the same, which can effectively produce bio-oil from biomass using a fast pyrolysis process.

BACKGROUND ART

In general, it is known that fossil fuels cause environmental pollution and have the limitation of estimating the amount thereof. Therefore, many efforts have been made to develop renewable energy that can be substituted for the fossil fuels in every country.

The renewable energy may be classified into new energy such as hydrogen, fuel cells, and coal gasification, and regenerative energy such as solar energy, wind power, waterpower, waste, sea, biomass, and subterranean heat. Recently, technologies for producing bio-oil using lignocellulose biomass have been actively conducted.

The bio-oil is a liquid fuel similar to a heavy oil produced by performing fast pyrolysis, high-temperature high-pressure hydrolysis, and the like with respect to lignocellulose biomass. Particularly, the fast pyrolysis is a pyrolysis technology having the highest yield of oil. However, the fast pyrolysis is a technology where accuracy is required since a very short reaction time is maintained, and a reaction temperature is in a relatively narrow range.

More specifically, in a method for preparing bio-oil using the fast pyrolysis, a high heat transfer rate is necessary at a reaction interface so as to increase the yield of the bio-oil. Therefore, the size of a material is necessarily decreased, and it is necessary to precisely control the reaction temperature and the temperature in a steam state to be maintained at 500° C. and 400 to 450° C., respectively. Also, the time at which a product exists in a steam state is necessarily controlled to be within about 2 seconds, and steam is necessarily cooled down in a short time. In addition, since char serves as a catalyst for decomposing a product in a steam state, it is necessary to rapidly separate and remove the char.

However, a fast pyrolysis technology that satisfies all of the aforementioned conditions is not put to practical use, and it is required to develop a system for preparing bio-oil using fast pyrolysis, in which the bio-oil can be prepared at a high yield.

DISCLOSURE OF INVENTION

Technical Goals

The present invention provides a device for preparing bio-oil, a system for preparing bio-oil and a method for preparing bio-oil using the same, in which biomass is fast pyrolyzed, so that bio-oil can be prepared at a high yield and efficiency.

The present invention also provides a device for preparing bio-oil, a system for preparing bio-oil and a method for preparing bio-oil using the same, which can simplify a structure for fast pyrolyzing biomass and can easily manufacture the structure with a low cost.

The present invention also provides a device for preparing bio-oil, a system for preparing bio-oil and a method for preparing bio-oil using the same, which can reduce cost and energy and enhance quality in the preparation of bio-oil.

Technical Solutions

According to an aspect of the present invention, there is provided a device for preparing bio-oil, the device including: a reactor configured to have an inclined portion formed to be inclined to at least one side portion thereof; a biomass supplier configured to be provided at one side of an upper portion of the reactor and to supply biomass to the inclined portion; a hot-sand supplier configured to be provided at the other side of the upper portion of the reactor so as to be disposed in front of the biomass supplier with respect to the movement direction of the biomass moved along the inclined portion, and to supply high-temperature hot sand to an upper side of the biomass so that the biomass is disposed between the inclined portion and the hot-sand supplier; and a heater configured to heat the inclined portion so as to fast pyrolyze the biomass together with the hot sand moved downward along the inclined portion.

That is, the biomass may be fast pyrolyzed between the inclined portion heated by the heater and the high-temperature hot sand. The biomass may be fast pyrolyzed while being slidingly moved downward along the inclined portion in the state that the biomass is covered by the hot sand. Thus, the reactor can continuously fast pyrolyze the biomass together with the hot sand moved downward along the inclined portion by gravity. It is unnecessary to use a separate transfer means for transferring the biomass and the hot sand.

The inclined portion may be formed to be inclined at an angle of 20 to 80 degrees from the ground. Thus, the reactor can properly select the angle of the inclined portion based on design conditions. In addition, the reactor may be formed to have a structure in which the angle of the inclined portion is controlled based on operational conditions.

At least one gas outlet for exhausting gas produced in the fast pyrolysis process of the biomass therethrough may be formed at the upper portion of the reactor. The bio-oil produced in the fast pyrolysis process of the biomass may be contained in the gas.

The reactor may be provided with a transparent window through which the fast pyrolysis process of the biomass is observed. The transparent window may include a plurality of transparent windows, and the plurality of transparent windows may be disposed to be spaced apart from one another on a side portion disposed opposite to the inclined portion. Also, the reactor may be provided with a temperature sensor for sensing the internal temperature in the fast pyrolysis process of the biomass. The temperature sensor may include a plurality of temperature sensors, and the plurality of temperature sensors may be disposed to be spaced apart from one another on the side portion disposed opposite to the inclined portion.

That is, since the transparent windows or the temperature sensors are disposed at a side portion of the reactor opposite to the inclined portion, they cannot come in contact with the biomass and the hot sand, moved downward along the inclined portion. In addition, since the transparent windows or the temperature sensors are disposed to be spaced apart from one another in a vertical direction at the side portion of the reactor, the fast pyrolysis process of the biomass can be sequentially observed.

A heat transfer portion that receives heat supplied from the heater to equally transfer the heat to the inclined portion may be provided to the inclined portion of the reactor. That is, since the heat transfer portion equally transfers heat generated from the heat to the entire area of the inclined portion, the fast pyrolysis performance of the biomass can be equalized regardless of the position of the inclined portion.

In this case, the heater may supply high-temperature hot gas to the heat transfer portion, and the heat transfer portion may be formed in the shape of a path along which the hot gas passes. That is, the heat generated from the heater may be transferred, together with combustion gas, in the form of hot gas to the heat transfer portion, and the inclined portion may be heated by the hot gas in the process of passing through the heat transfer portion.

A hot gas inlet having the hot gas sucked therethrough may be formed at a lower portion of the heat transfer portion, and a hot gas outlet having the hot gas, heated by the inclined portion, exhausted therethrough may be formed at an upper portion of the heat transfer portion. Thus, hot gas sucked through the hot gas inlet is flowed upward along the heat transfer portion, and the heat of the hot gas is transferred to the inclined portion in the flow process.

A heat transfer structure for enhancing the heat transfer performance with the hot gas may be formed on at least one of the inclined portion of the reactor and the heat transfer portion. For example, the heat transfer structure may include a fin, a blade, and the like. The fin or blade may be formed to various patterns and shapes based on design conditions of the device.

An auxiliary heater that controls the reaction temperature of the biomass by heating the inclined portion may be provided to the inclined portion of the reactor. That is, the reaction temperature may be lower than a setting temperature due to the initial operation of the reactor, the abnormal operation of the heater, the change in the temperature of the hot sand, the biomass, and the like. If the reaction temperature of the biomass is lowered, the auxiliary heater is operated, so that the reaction temperature of the biomass can be maintained as a first setting temperature.

The hot-sand supplier may be provided with a hot-sand heater that controls the temperature of the hot sand by heating the hot sand. That is, if the temperature of the hot sand is lower than a second setting temperature, the hot-sand heater is operated, so that the temperature of the hot sand can be maintained as the second setting temperature.

The biomass supplier may be provided with an anti-clumping mechanism for preventing the clumping of the biomass. Thus, a clumped state of the biomass is loosened by the anti-clumping mechanism, so that the biomass can be smoothly supplied to the interior of the reactor.

For example, the anti-clumping mechanism may include a rod portion configured to be disposed to be movable in the interior of the biomass supplier, and to have one end disposed to pass through the exterior of the biomass supplier; a plurality of projections configured to protrude from the rod portion and to loosen a clumped state of the biomass when the rod portion is moved; and a driver portion configured to be connected to one end of the rod portion and to reciprocate the rod portion.

The rod portion may be disposed at a portion connected to the upper portion of the reactor. Thus, the clumped state of the biomass can be solved before the biomass is inserted into the interior of the reactor.

The projections may be formed to protrude toward the reactor from the rod portion. An end portion of the projection may be bent in the direction intersected with the length directions of the rod portion and the projection.

The device may further include a polymer compound supplier configured to be provided to the upper portion of the reactor and to supply a polymer compound with the biomass. If a polymer compound is supplied to the interior of the reactor, the quality of the bio-oil produced in the fast pyrolysis process of the biomass can be remarkably improved, and the yield and amount of the bio-oil can be increased.

According to another aspect of the present invention, there is provided a system for preparing bio-oil, the system including: a reactor configured to have an inclined portion formed to be inclined to at least one side portion thereof; a biomass supplier configured to be provided at one side of an upper portion of the reactor and to supply biomass to the inclined portion; a hot-sand supplier configured to be provided at the other side of the upper portion of the reactor so as to be disposed in front of the biomass supplier with respect to the movement direction of the biomass together with the hot sand moved along the inclined portion, and to supply high-temperature hot sand to an upper side of the biomass so that the biomass is disposed between the inclined portion and the hot-sand supplier; a heater configured to heat the inclined portion so as to fast pyrolyze the biomass together with the hot sand moved downward along the inclined portion; a cyclone mechanism configured to receive gas produced in the interior of the reactor and to remove a solid matter contained in the gas; a condenser configured to condense the gas obtained by removing the solid matter in the cyclone mechanism and to extract bio-oil; a post-processing mechanism configured to post-process combustion gas exhausted from the heater and to remove a harmful object contained in the combustion gas; and a gas analyzer configured to analyze components of the combustion gas post-processed by the post-processing mechanism.

That is, the biomass may be fast pyrolyzed between the inclined portion heated by the heater and the high-temperature hot sand. A solid matter is removed from the fast pyrolyzed gas by the cyclone mechanism, so that bio-oil can be extracted from the condenser.

The heater may burns gas that is not condensed in the condenser and may burns char that is discharged from the reactor, and may heats hot sand that is discharged from the reactor. That is, the non-condensed gas and the char may be burned by the heater, and the hot sand may be recycled as a high-temperature hot sand by the heater.

The hot-sand supplier may receive the hot sand heated from the heater, and the reactor may receive hot gas generated from the heater in the interior thereof. Thus, since the hot sand is repeatedly re-used, the cost of the hot sand can be reduced. Also, since a non-active hot gas generated from the heater is filled in the interior of the reactor, the interior of the reactor can be formed under a nonoxidizing atmosphere greater than the atmospheric pressure.

In the related art, the interior of the reactor is formed under the nonoxidizing atmosphere by injecting an inert gas into the interior of the reactor at a high pressure. However, in the embodiment of the present invention, a portion of hot gas generated by the heater is supplied to the interior of the reactor, in place of the inert gas. Thus, high-priced inert gas is not used, thereby reducing cost. Also, an additional device for supplying the inert gas at a high pressure is omitted, thereby reducing the manufacturing cost and operational cost of the device. That is, the related art device for supplying the inert gas has high-priced cost and uses a large amount of energy so as to supply gas at a high pressure.

The system may further include a conveyor mechanism configured to be provided between the lower portion of the reactor and the heater and to transfer the char and the hot sand, discharged from the reactor, to the heater. Thus, the char and the hot sand, continuously discharged from the reactor, may be continuously transferred to the heater. Particularly, since the char may interrupt the fast pyrolysis process of the biomass, it is very important to rapidly remove the char in real time without having the char remain for a long period of time.

A heat transfer portion that receives heat supplied from the heater to equally transfer the heat to the inclined portion may be provided to the inclined portion of the reactor. That is, since the heat transfer portion equally transfers the heat supplied from the heater to the entire area of the inclined portion, the fast pyrolysis performance of the biomass can be equalized regardless of the position of the inclined portion.

In addition, the system may further include a preheater configured to preheat gas supplied to the heater using waste heat exhausted from the reactor or the heat transfer portion. Thus, since a portion of waste heat exhausted from the reactor or the heat transfer portion is collected through the preheater, the energy efficiency of the entire system can be improved. Also, the load of the heater is increased, thereby increasing the burning efficiency.

The cyclone mechanism may be provided with a heat retaining structure configured to prevent the lowering of an internal temperature so that the bio-oil is not condensed in the processing of the gas. This is because if the internal temperature of the cyclone mechanism is lowered, bio-oil contained in the gas is condensed in the interior of the cyclone mechanism, and therefore, the yield of the bio-oil may be considerably decreased. The heat retaining structure may include all structures having the function of remaining the internal temperature of the cyclone mechanism as a temperature at which the bio-oil is not condensed. For example, the heat retaining structure may be a structure for insulating the cyclone mechanism from the exterior or a structure for controlling the internal temperature of the cyclone mechanism.

The condenser may include a mid-temperature condenser configured to condense the gas obtained by removing the solid matter in the cyclone mechanism at a mid-temperature, an electrical collector configured to electrically collect gas that is not condensed in the mid-temperature condenser, and a low-temperature condenser configured to condense the gas collected by the electrical collector at a low temperature.

Thus, the mid-temperature condenser and the low-temperature condenser extract the bio-oil at different condensation temperatures, thereby increasing the yield of the bio-oil. Also, the electrical collector electrically collects bio-oil in a droplet state, contained in the gas that is not condensed in the mid-temperature condenser, thereby increasing the yield of the bio-oil.

The operation of at least one of the reactor, the biomass supplier, the hot-sand supplier, the heater, the cyclone mechanism and the condenser may be controlled based on an analysis value of the gas analyzer. Thus, the presence of the normal operation of the system can be simply detected based on the analysis value of the gas analyzer, and the abnormally operated mechanism can be easily checked.

The system may further include a polymer compound supplier configured to be provided to the upper portion of the reactor and to supply a polymer compound with the biomass. If a polymer compound is supplied to the interior of the reactor, the yield and amount of the bio-oil can be increased, and the quality of the bio-oil can be improved.

According to still another aspect of the present invention, there is provided a method for preparing bio-oil, the method including: a biomass supply step of supplying biomass to an inclined portion formed on a side portion of the reactor; a hot-sand supply step of supplying high-temperature hot sand to an upper side of the biomass supplied to the inclined portion; a fast pyrolysis step of heating the inclined portion to fast pyrolyze the biomass together with the hot sand moved downward along the inclined portion; a cyclone step of receiving gas produced in the fast pyrolysis process of the biomass to remove a solid matter contained in the gas; a condensation step of condensing gas obtained by removing the solid matter in the cyclone step to extract bio-oil from the gas; a burning step of combustion gas that is not condensed in the condensation step and char and hot sand that is produced in the fast pyrolysis step; a hot-sand collection step of transferring high-temperature hot sand recycled in the burning step to the hot-sand supply step; a hot gas supply step of supplying hot gas generated in the burning step to the interior of the reactor; a post-processing step of filtering combustion gas produced in the burning step to remove a harmful object contained in the combustion gas; a gas analysis step of analyzing components of the combustion gas post-processed in the post-processing step; and an operation control step of controlling the operation of at least one of the biomass supply step, the hot-sand supply step, the fast pyrolysis step, the cyclone step, the condensation step and the hot gas supply step based on the components of the combustion gas analyzed in the gas analysis step. However, in the gas analysis step, the gases produced in the other processes except the post-processing can be analyzed.

That is, if biomass and hot sand are supplied in the biomass supply step and the hot-sand supply step, the fast pyrolysis process of the biomass can be continuously performed while the biomass and the hot sand are moved downward along the inclined portion in the fast pyrolysis step. Thus, in the fast pyrolysis step, the fast pyrolysis process of the biomass can be simply performed by only gravity with no separate power.

In the fast pyrolysis step, the inclined portion may be heated using heat generated in the burning step. That is, in the fast pyrolysis step, the biomass is fast pyrolyzed using heat that burns the char, hot sand and non-condensed gas in the burning step, thereby improving energy efficiency and reducing fuel expense.

In the burning step, external gas used in burning may be preheated using waste heat exhausted in the fast pyrolysis step. Thus, the load due to the low-temperature external gas can be reduced in the burning step, thereby increasing the burning efficiency.

The condensing step may include a mid-temperature condensation step of condensing the gas obtained by removing the solid matter in the cyclone step at a mid-temperature to extract bio-oil with a high molecular weight; an electrical collection step of electrically collecting gas that is not condensed in the mid-temperature condensation step to collect bio-oil in a droplet state, contained in the gas; and a low-temperature condensation step of condensing the gas electrically collected in the electrical collection step at a low temperature to extract bio-oil with a low molecular weight from the gas. That is, bio-oil with a high molecular weight and bio-oil with a low molecular weight, which have different condensing points, may be extracted in the mid-temperature condensation step and the low-temperature condensation step, respectively. In the electrical collection step, a droplet-state bio-oil with the high molecular weight can be collected.

The method may further include a polymer compound supply step of supplying a polymer compound with the biomass. Waste plastic smashed to pieces is used as an example of the polymer compound.

The reactor may be provided with a temperature sensor for sensing an internal temperature in the fast pyrolysis process of the biomass, and an auxiliary heater for selectively heating the inclined portion. In the fast pyrolysis step, the auxiliary heater may be operated when the value sensed by the temperature sensor is less than a setting temperature.

That is, the reaction temperature of the biomass may be lower than a setting temperature due to the initial operation of the reactor, the abnormal operation of the heater, the change in the temperature of the hot sand, the biomass, and the like. Thus, if the sensing temperature of the temperature sensor is lower than the first setting temperature, the auxiliary heater is operated, thereby controlling the reaction temperature of the biomass.

Advantageous Effect

In a device for preparing bio-oil, a system for preparing bio-oil and a method for preparing bio-oil using the same, biomass covered by high-temperature hot sand is moved downward along an inclined portion of a reactor, heated by a heater, thereby fast pyrolyzing the biomass. Accordingly, the fast pyrolysis performance of the biomass can be stably ensured, and the yield of bio-oil can be considerably enhanced.

Also, in a device for preparing bio-oil, a system for preparing bio-oil and a method for preparing bio-oil using the same, according to an embodiment of the present invention, the configuration and method for fast pyrolyzing biomass are simply formed. Accordingly, the manufacture and operation of a product can be easily performed, and the manufacturing cost and operational cost of the product can be reduced.

Also, in a device for preparing bio-oil according to an embodiment of the present invention, since a transparent window or temperature sensor is provided to a reactor, the fast pyrolysis process of biomass can be observed in real time through the transparent window, and the reaction temperature of the biomass can be checked in real time through the temperature sensor.

Also, in a device for preparing bio-oil, a system for preparing bio-oil and a method for preparing bio-oil using the same, according to an embodiment of the present invention, since an auxiliary heater is provided to an inclined portion of a reactor, the reaction temperature of biomass can be simply maintained at a setting temperature, thereby enhancing the yield of bio-oil. Particularly, the heater and the auxiliary heater are simultaneously operated in the initial stage of the operation of the reactor, so that the reaction temperature of the biomass can be reached faster than the setting temperature. In addition, when the reaction temperature of the biomass is lowered due to a change in the operational temperature of the heater and a change in the temperature of hot sand, the auxiliary heater is selectively operated, so that the reaction temperature of the biomass can be constantly maintained at the setting temperature.

Also, in a device for preparing bio-oil according to an embodiment of the present invention, since an anti-clumping mechanism is provided to a biomass supplier, the clumping of biomass inserted into a reactor is prevented by the anti-clumping mechanism, thereby enhancing the supply performance of the biomass supplier.

Also, in a device for preparing bio-oil, a system for preparing bio-oil and a method for preparing bio-oil using the same, according to an embodiment of the present invention, a polymer compound supplier for supplying a polymer compound is provided to an inclined portion of a reactor so that the polymer compound is fast pyrolyzed together with biomass in the fast pyrolysis process of the biomass. Accordingly, the quality of bio-oil can be improved, and the yield and acquisition amount of the bio-oil can be increased.

Also, in a device for preparing bio-oil, a system for preparing bio-oil and a method for preparing bio-oil using the same, according to an embodiment of the present invention, since external gas supplied to a heater is preheated using waste heat exhausted from a reactor or heat transfer portion, the waste heat exhausted from the reactor or heat transfer portion is collected, thereby increasing the energy efficiency of the entire system, and the load of the heater is reduced, thereby increasing the burning efficiency of the heater.

Also, in a device for preparing bio-oil, a system for preparing bio-oil and a method for preparing bio-oil using the same, according to an embodiment of the present invention, hot sand used in the fast pyrolysis process of biomass is recycled in a heater, and the recycled hot sand is re-used in the fast pyrolysis process of the biomass. Accordingly, the hot sand can be repeatedly re-used, thereby reducing maintenance and repair cost.

Also, in a device for preparing bio-oil, a system for preparing bio-oil and a method for preparing bio-oil using the same, according to an embodiment of the present invention, since inert hot gas generated from the heater is supplied to the interior of a reactor, the internal pressure of the reactor is increased, so that it is possible to prevent external gas from being flowed into the interior of the reactor. Accordingly, a nonoxidizing atmosphere can be formed in the interior of the reactor by the hot gas, and the oxidation of biomass can be prevented in the fast pyrolysis process of the biomass, thereby increasing the yield and efficiency of the device.

In addition, since the hot gas generated from the heater is provided to the interior of the reactor, a separate device for injecting an inert gas to the interior of the reactor at a high pressure can be omitted. If the device for supplying the inert gas is omitted, the manufacturing cost of the device can be decreased, and energy for operating the device can be reduced. If a high-priced inert gas is not used, the operational cost of the device can be considerably reduced.

Also, in a device for preparing bio-oil, a system for preparing bio-oil and a method for preparing bio-oil using the same, according to an embodiment of the present invention, harmful objects contained in finally exhausted gas can be removed using a post-processing mechanism, and components of the gas post-processed by the post-processing mechanism can be analyzed using a gas analyzer. Particularly, a process for preparing bio-oil can be properly controlled based on analysis data of the gas analyzer.

BEST MODE FOR CARRYING OUT THE INVENTION

Figure 1:
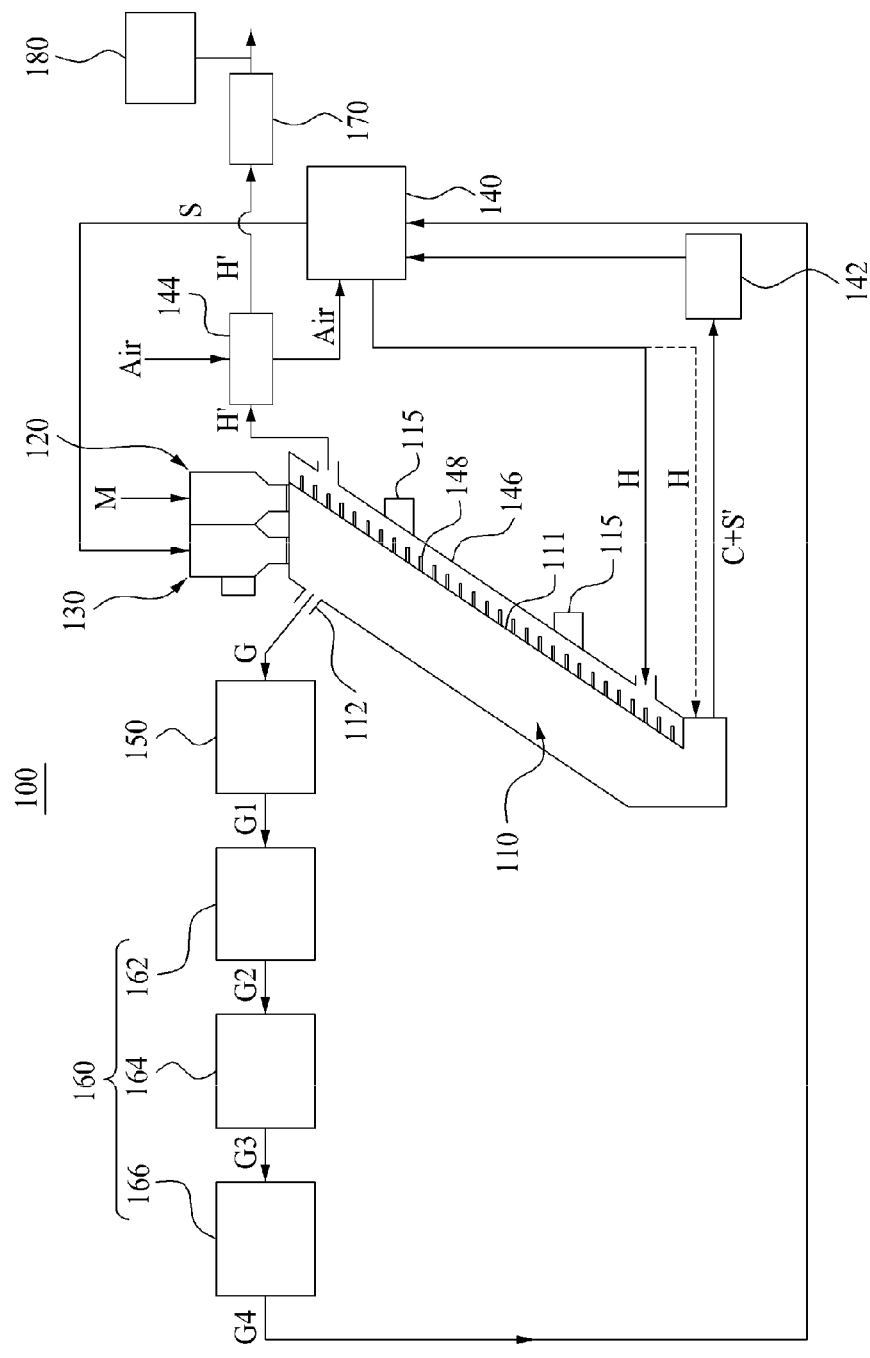
FIG. 1 is a configuration view schematically showing a system for preparing bio-oil according to an embodiment of the present invention.

Reference will now be made in detail to exemplary embodiments of the present invention, examples of which are illustrated in the accompanying drawings, wherein like reference numerals refer to the like elements throughout.

Figure 2:
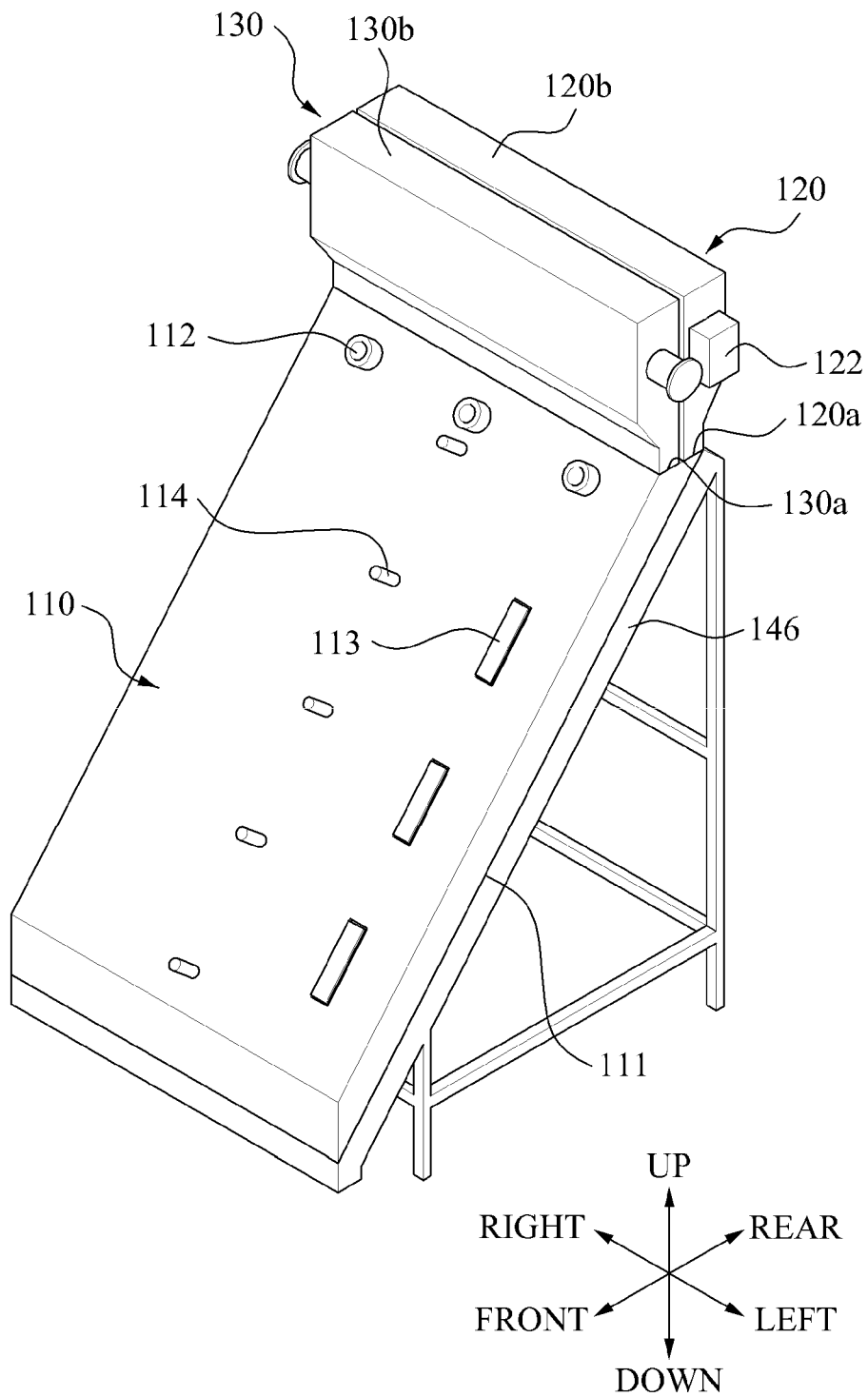
FIG. 2 is a perspective view showing a device for preparing bio-oil in the system shown in FIG. 1.
Figure 3:
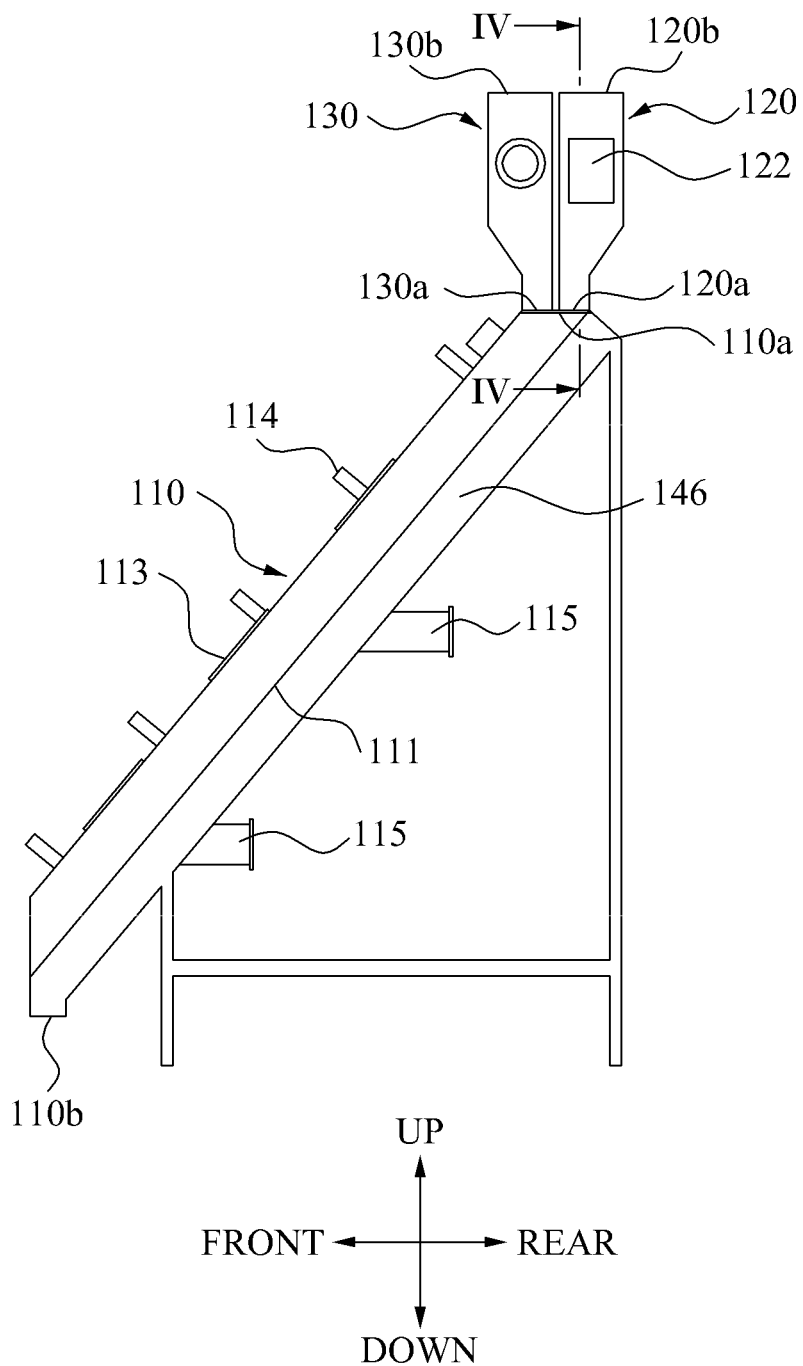
FIG. 3 is a left side view showing the device shown in FIG. 2.
Figure 4:
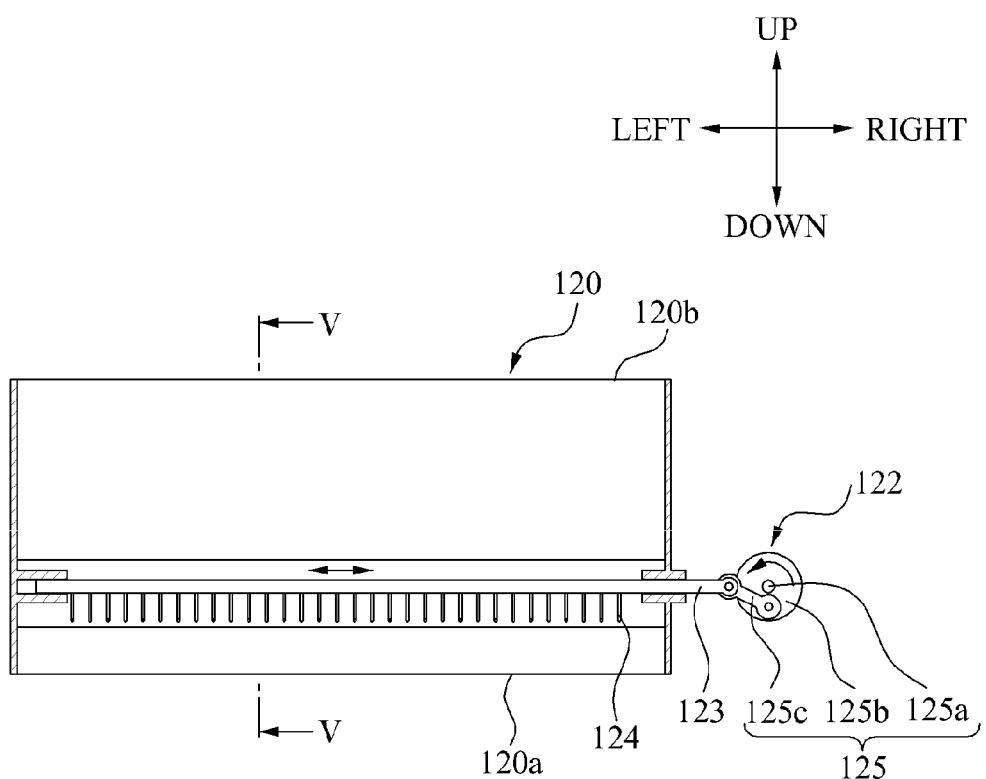
FIG. 4 is view taken along line IV-IV of FIG. 3.
Figure 5:
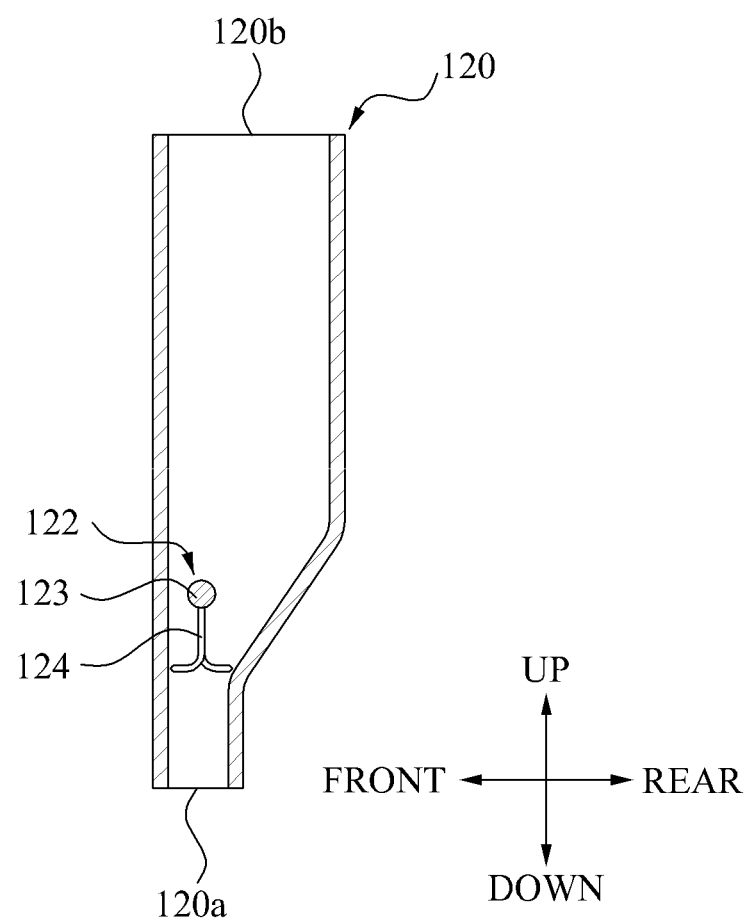
FIG. 5 is view taken along line V-V of FIG. 4.
Figure 6:
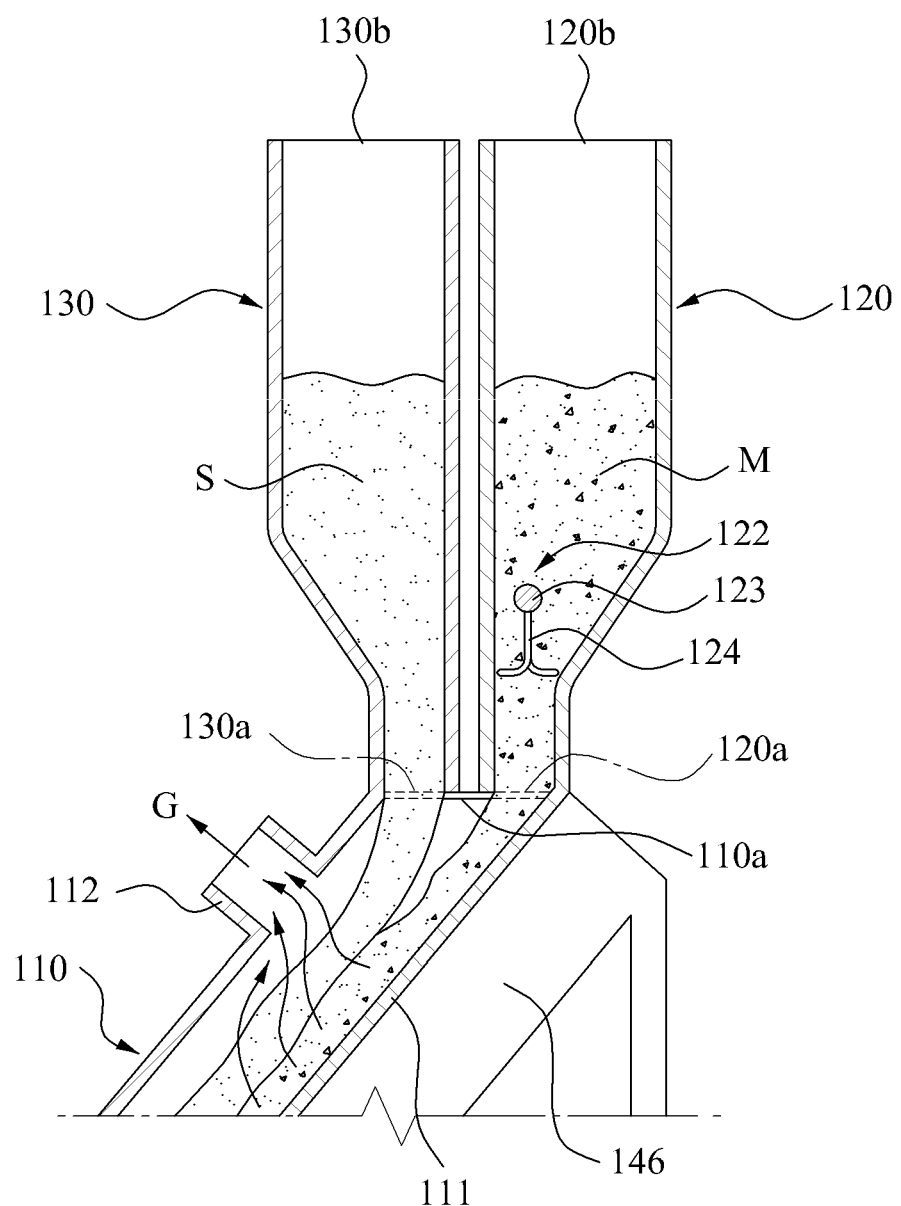
FIG. 6 is a view showing an operational state of the device according to the embodiment of the present invention.

FIG. 1 is a configuration view schematically showing a system for preparing bio-oil according to an embodiment of the present invention. FIG. 2 is a perspective view showing a device for preparing bio-oil in the system shown in FIG. 1. FIG. 3 is a left side view showing the device of FIG. 2. FIG. 4 is view taken along line A-A of FIG. 3. FIG. 5 is view taken along line B-B of FIG. 4. FIG. 6 is a view showing an operational state of the device according to the embodiment of the present invention.

Referring to FIG. 1, the system 100 according to the embodiment of the present invention is a device that prepares bio-oil from biomass M using fast pyrolysis. Generally, the biomass M may include lignocellulose, cellulose, water plant, organic sludge, manure, food waste, and the like. Hereinafter, it has been described in this embodiment that the system 100 produces bio-oil from lignocellulose biomass M for convenience of illustration. However, the present invention is not limited to the lignocellulose biomass M. That is, cellulose, sewage sludge, and the like may be used as the biomass M.

In the system 100, the device for preparing bio-oil, which allows the biomass M to be fast pyrolyzed, may include a reactor 110, a biomass supplier 120, a hot-sand supplier 130, and a heater 140.

Referring to FIGS. 1 to 3, the reactor 110 is a device that produces bio-oil from biomass M by fast pyrolyzing the biomass M. The reactor 110 may have a hollow interior to accommodate the biomass M. An entrance 110a may be formed at an upper portion of the reactor 110 so that the biomass M and hot sand S are injected therethrough. An exit 110b may be formed at a lower portion of the reactor 110 so that char C produced in the fast pyrolysis of the biomass M and the hot sand S used in the fast pyrolysis of the biomass M may be discharged.

The reactor 110 may be provided with an inclined portion 111 formed to be inclined to at least one side portion thereof. The biomass M and the hot sand S may be disposed into a structure stacked on the inclined portion 111, and may be slidingly moved downward along the inclined portion 111 by gravity. That is, in the reactor 110, a separate driving means or moving means for moving the biomass M and the hot sand S may be omitted. Thus, the structure of the reactor 110 can be very simply formed, and the manufacturing cost and driving cost of the reactor 110 can be reduced.

The inclined portion 111 may be formed at an angle of 20 to 80 degrees from the ground. The angle of the inclined portion 111 may be variously selected based on design conditions of the reactor 110. Alternatively, the angle of the inclined portion 111 may be selectively controlled based on operational conditions of the reactor 110. Hereinafter, it is described in this embodiment that the angle of the inclined portion 111 is formed to be 50 to 60 degrees.

The reactor 110 may be formed to have a cross-section of any one of a circle, an ellipse and a polygon. Hereinafter, it is described in this embodiment that the reactor 110 is formed to have a section of a rectangle.

Also, as shown in FIGS. 2 and 3, the inclined portion 111 is formed at a rear portion of the reactor 110, and the reactor 110 is inclined toward the rear from the ground. That is, the reactor 110 has four side portions, i.e., front, left-side, right-side and rear portions, and the entire rear portion forms the inclined portion.

At least one gas outlet 112 through which gas produced in the fast pyrolysis process of the biomass M is exhausted may be formed at an upper portion of the reactor 110. Hereinafter, it is described in this embodiment that a plurality of gas outlets 112 is disposed to be spaced apart from one another at the front upper portion of the of the reactor 110 disposed opposite to the inclined portion 111.

The reactor 110 may be provided with a transparent window 113 through which the fast pyrolysis process of the biomass M can be observed with the naked eye. The reactor 110 may be further provided with a temperature sensor 114 through which the internal temperature of the reactor 110 can be sensed in the fast pyrolysis process of the biomass M. Each of the transparent window 113 and the temperature sensor 114 may include a plurality of transparent windows or temperature sensors disposed to be spaced apart from one another in a vertical direction on the front of the reactor 110 disposed opposite to the inclined portion 111. That is, if the transparent windows 113 and the temperature sensors 114 are disposed at the front of the reactor 110, they do not come in contact with the biomass M disposed on the inclined portion 111. If the transparent windows 113 and the temperature sensors 114 are disposed to be spaced apart from one another in the vertical direction, the states and reaction temperatures of the biomass M can be sequentially checked along the fast pyrolysis process of the biomass M.

The inclined portion 111 of the reactor 110 may be provided with an auxiliary heater 115 that controls the reaction temperature of the biomass M by heating the inclined portion 111. The auxiliary heater 115 may include various heating means such as an electric heater and a gas burner, so that control of the reaction temperature of the biomass M is easy.

The auxiliary heater 115 may include a plurality of auxiliary heaters disposed to be spaced apart from one another in the vertical direction. The auxiliary heater 115 may be separately operated regardless of the operation of the heater 140. For example, in the initial stage of the fast pyrolysis process, the heater 140 and the auxiliary heaters 115 are operated together so that the reaction temperature of the biomass M can be rapidly increased. When the heater 140 is abnormally operated or the temperature of the biomass M and the hot sand S is decreased, any one of the auxiliary heaters 115 is selectively operated, so that it is possible to prevent the reaction temperature from being decreased.

Referring to FIGS. 1 to 6, the biomass supplier 120 is a device that supplies the biomass M to the inclined portion 111 of the reactor 110. The biomass supplier 120 may be communicated with the reactor 110 at an upper portion of the reactor 110. An inserting hole 120b having the biomass M inserted therethrough may be formed at an upper portion of the biomass supplier 120, and a discharge hole 120a may be formed at a lower portion of the biomass supplier 120. In this case, the discharge hole 120a is communicated with the entrance of the reactor 110 so that the biomass M is discharged therethrough. At least one of the discharge hole 120a of the biomass supplier 120 and the entrance 110a of the reactor 110 may be formed to be opened/closed.

The biomass supplier 120 may be provided with an anti-clumping mechanism 122 that prevents the clumping of the biomass M to be discharged through the discharge hole 110b. That is, since the biomass M is lignocellulose biomasses, e.g., sawdusts or wood chips, smashed to splinters, it is highly likely that the biomass M is clumped in the interior of the biomass supplier 120. However, if the biomass M is clumped in the interior of the biomass supplier 120, it is not inserted into the interior of the reactor, or is inserted in a lump state when the discharge hole 110*b* of the biomass supplier 120 and the entrance 110*a* of the reactor 110 are opened. Accordingly, the biomass supplier 120 is provided with the anti-clumping mechanism 122 that can solve the clumped state of the biomass M, so that the biomass M can be smoothly supplied to the interior of the reactor 110 from the biomass supplier 120.

For example, the anti-clumping mechanism 122 may include a rod portion 123 disposed to be movable in the interior of the biomass supplier 120 and having one end disposed to pass through the exterior of the biomass supplier 120; a plurality of projections 124 protruded from the rod portion 123 to loosen the clumped state of the biomass M in the movement of the rod portion 123; and a driving portion 125 connected to one end of the rod portion 123 to reciprocate the rod portion 123.

The rod portion 123 may be disposed at an upside of the discharge hole 110*b* of the biomass M. One end of the rod portion 123 may be disposed to pass through any one of left and right surfaces of the biomass supplier 120, and the other end of the rod portion 123 may be disposed to be movable on the other surface of the biomass supplier 120. Hereinafter, it is described in this embodiment that the one end of the rod portion 123 is disposed to pass through the left surface of the biomass supplier 120 and the other end of the rod portion 123 is disposed to be movable on the right surface of the biomass supplier 120.

The projections 124 may be formed to protrude downward to the reactor 110 from the rod portion 123. An end of the projection 124 may be bent in the direction intersected with the length directions of the rod portion 123 and the projection 124. Hereinafter, it is described in this embodiment that the end of the projection 124 is bent in the direction perpendicular to all of the length directions of the rod portion 123 and the projection 124. Therefore, the projection 124 is formed in an 'L' shape.

The projections 124 may be disposed to be spaced apart from one another at the same interval in the length direction of the rod portion 123. The projections 124 may be disposed to cross one another along the length direction of the rod portion 123 so that the end of one projection 124 has a bending direction formed opposite to ends of adjacent projections 124.

The driving portion 125 may include a driving motor 125*a* that generates driving power of the rod portion 123; a rotating body 125*b* rotated by the driving motor 125*a*; and a power transfer link 125*c* connected to rotate one end of the rod portion 123 and both ends of the rotating body 125*b* and to change the rotation movement of the rotating body 125*b* into the linear reciprocating movement of the rotating body 125*b*. However, the driving portion 125 may be formed to have various structures in which the rod portion 123 can be linearly reciprocated.

Referring to FIGS. 1 to 3, the hot-sand supplier 130 is a device that supplies high-temperature hot sand S to an upper side of the biomass M supplied to the inclined portion 111 of the reactor. The hot sand S is a material that covers the upper side of the biomass M to promote the fast pyrolysis process of the biomass M. The hot sand S may include a material with a small particle, e.g., a sand or steel ball, which will not melt in the fast pyrolysis process of the biomass M. Hereinafter, it is described in this embodiment that the sand is used as the hot sand S.

In this case, an inserting hole 130*b* having the hot sand S inserted therethrough may be formed at an upper portion of the hot-sand supplier 130, and a discharge hole 130*a* communicated with the entrance 110*a* of the reactor 110 to discharge the hot sand S may be formed at a lower portion of the hot-sand supplier 130. At least one of the discharge hole 130*a* of the hot-sand supplier 130 and the entrance 110*a* of the reactor 110 may be formed to be opened/closed.

The hot-sand supplier 130 may be provided with a hot-sand heater 140 that heats the hot sand S to control the temperature of the hot sand S. The hot-sand heater 140 may include various heating means such as an electric heater and a gas burner, so that control of the temperature of the hot sand S is easy. That is, the hot-sand heater 140 can constantly maintain the temperature of the hot sand S as a temperature optimized in the fast pyrolysis process of the biomass M.

Referring to FIGS. 1 to 3, the heater 140 is a device that heats the inclined portion 111 by supplying hot gas H to the inclined portion 111 of the reactor 110. Thus, as the biomass M is moved downward along the inclined portion 111, it can be fast pyrolyzed by the hot gas H of the heater 140 and the heat of the hot sand S. The heater 140 may include an electric heater, a gas burner, a burning furnace, a fluidize bed burner and the like. Hereinafter, it is described in this embodiment that the burning furnace is used as the heater 140.

The heater 140 transfers heat in the form of a high temperature hot gas H to the inclined portion 111, a combustion gas generated in the burning furnace may be contained in the hot gas H. Therefore, the heater 140 may be disposed at a position relatively lower than the reactor 110. Then, the hot gas H generated from the heater 140 is naturally transferred to the reactor 110. Alternatively, if the heater is disposed at a position relatively higher than the reactor 110, a separate ventilator may be added to smoothly supply the hot gas H generated from the heater 140 to the reactor 110.

A conveyor mechanism 142 may be disposed between the exit 110*b* of the reactor 110 and the heater 140. In this case, the conveyor mechanism 142 transfers the char C and hot sand S discharged through the exit 110*b* of the reactor 110 to the heater 140. The conveyor mechanism 142 may include a screw conveyor, a belt conveyor, a bucket conveyor and the like.

As described above, the heater 140 may heats the char C and hot sand S' discharged through the exit 110*b* of the reactor 110, and the gas G4 that is not condensed in a condenser 160 which will be described later. Thus, the non-condensed gas G4 and the char C can be burned and removed in the heater 140, and the hot sand S' can be heated in the heater to be recycled as high-temperature hot sand S. Subsequently, the hot sand S recycled in the heater 140 may be collected by the hot-sand supplier 130.

The heater 140 may supply a portion of the hot gas H generated in the burning furnace to the interior of the reactor 110. Then, in the fast pyrolysis process of the biomass M, the internal pressure of the reactor 110 is increased to have an appropriate pressure, so that the inflow of an external device can be prevented. Also, the interior of the reactor 110 is formed under a non-oxidizing atmosphere, so that the burning of the biomass M can be prevented. Since the burning of the biomass M is prevented, all of the biomass M is fast pyrolyzed, thereby enhancing the yield of the bio-oil.

A heat transfer portion 146 may be formed at the inclined portion 111 of the reactor 110 so that the hot gas H of the heater 140 is equally transferred to the entire inclined portion 111. Therefore, the auxiliary heater 115 may be provided to the inclined portion 111 to supply heat directly to the inclined portion 111 regardless of the heat transfer portion 146, or may be provided to the heat transfer portion 146 to supply heat to the interior of the heat transfer portion 146. Hereinafter, it is described in this embodiment that the auxiliary heater 115 is provided to the heat transfer portion 146.

The heat transfer portion 146 may be a path-shaped cavity formed on the rear of the inclined portion 111. That is, the hot gas H transferred from the heater 140 remains in the interior of the heat transfer portion 146 for a predetermined time so that the heat of the hot gas H can be equally transferred to the entire area of the inclined portion 111. A hot gas inlet having the hot gas H sucked therethrough is formed at a lower portion of the heat transfer portion 146, and a hot gas outlet through which hot gas H' used in the burning of the inclined portion 111 is exhausted may be formed at an upper portion of the heat transfer portion 146. Thus, the hot gas H sucked through the hot gas inlet is flowed upward along the heat transfer portion 146, and the heat of the hot gas H is transferred to the inclined portion 111 in the flow process.

In addition, a heat transfer structure 148 for increasing the heat transfer performance with the hot gas H may be formed in the interior of the heat transfer portion 146. That is, the heat transfer structure 148 may be formed in at least one of the inclined portion 111 and the heat transfer portion 146. For example, the heat transfer structure 148 may be formed in the shape of a fin or blade to increase the contact area with the hot gas H. The heat transfer structure may be formed to have various patterns and shapes based on design conditions. Hereinafter, it is described in this embodiment that the heat transfer structure 148 includes a plurality of fins formed to be spaced apart from one another in a vertical direction. However, the present invention is not limited thereto.

The heater 140 may further include a preheater 144 that preheats gas supplied to the heater 140 using waste heat H' exhausted to the external device from the heat transfer portion 146 or the reactor 110. In this case, the waste heat H' corresponds to hot gas H' obtained by using the hot gas H supplied to the heat transfer portion 146 or the reactor 110 in the fast pyrolysis process of the biomass M and then exhausting the used hot gas H to the external device.

If the preheated gas is supplied to the heater 140, the load of the heater 140 is substantially reduced, thereby increasing the burning efficiency of the heater 140. The preheater 144 may include a heat transfer type heat exchanger, an gas cooling type heat exchanger and the like. The preheater 144 may be disposed on the path along which external gas is guided to the interior of the heater 140, or may be disposed on the path of the waste heat H' exhausted from the heat transfer portion 146 or the reactor 110.

Referring to FIG. 1, the system 100 according to the embodiment of the present invention may further include a cyclone mechanism 150 and a condenser 160.

The cyclone mechanism 150 is a device that receives gas G exhausted through the gas outlet 112 of the reactor 110 and removes a solid matter contained in the gas G through a cyclone phenomenon. The char C that has bad influence on the process of preparing the bio-oil is representative as the solid matter removed by the cyclone mechanism 150. If necessary, the cyclone mechanism 150 may remove the solid matter contained in the gas G through one or several cyclone processes. Hereinafter, it is described in this embodiment that a multi-stage-cyclone mechanism that performs several cyclone process is used as the cyclone mechanism 150.

A heat retaining structure may be provided to the multi-stage-cyclone mechanism 150 so as to prevent the lowering of the internal temperature. For example, the heat retaining structure may include a structure that blocks heat discharged from the multi-stage-cyclone mechanism 150 using a material for heat retention such as a heat insulator, a structure that actively controls the internal temperature of the multi-state-cyclone mechanism 150 using a material for heat generation such as a heater, and the like.

The reason for preventing the temperature of the multi-stage-cyclone mechanism 150 from being lowered as described above is that the bio-oil containing the gas G may be abnormally condensed in the interior of the multi-stage-cyclone mechanism 150. That is, since the bio-oil condensed in the interior of the multi-stage-cyclone mechanism 150 is discharged together with the solid matter to the exterior thereof, the content of the bio-oil to be condensed in the condenser 160 is decreased, and therefore, the yield of the bio-oil may be considerably lowered.

The condenser 160 is a device that extracts bio-oil by condensing gas G1 obtained by removing the solid matter in the multi-stage-cyclone mechanism 150. The condenser 160 may include a mid-temperature condenser 162 that condenses the gas G1 obtained by removing the solid matter in the multi-stage-cyclone mechanism 150 at a mid-temperature; an electrical collector 164 that electrically collects gas G2 that is not condensed in the mid-temperature condenser 162; and a low-temperature condenser 166 that condenses gas G3 collected by the electrical collector 164 at a low temperature.

In this case, the mid-temperature condenser 162 may extract bio-oil with a relatively high molecular weight by condensing the gas G1 at a mid-temperature, or may extract bio-oil with a low molecular weight by condensing the gas G3 at a low temperature. The mid-temperature that is a condensation temperature of the mid-temperature condenser 162 is generally ambient temperature, and the low temperature that is a condensation temperature of the low-temperature condenser 166 is generally sub-zero temperatures.

The electrical collector 164 electrically collects bio-oil in a droplet state, contained in the gas G2 that is not condensed in the mid-temperature condenser 162, thereby completely extracting bio-oil with a high molecular weight.

Referring to FIG. 1, the system 100 according to the embodiment of the present invention may further include a post-processing mechanism 170 and a gas analysis system 180.

The post-processing mechanism 170 is a device that removes harmful objects contained in the hot gas H' by post-processing the hot gas H' heat-exchanged in the preheater 144. The post-processing mechanism 170 may be configured as filters with various structures based on components of the hot gas H' exhausted in the gas. For example, the post-processing mechanism 170 may include a filter with a sponge structure containing activated carbon particles, platinum catalysts, palladium catalysts, and the like. The post-processing mechanism 170 functions to prevent environmental pollution by purifying the hot gas H' before being exhausted in the gas.

The gas analyzer 180 is a device that analyzes components of the hot gas H' post-processed by the post-processing mechanism 170. By using the analysis data of the hot gas H' analyzed by the gas analyzer 180, whether the operation of the system 100 is normal or abnormal may be measured. For example, at least one of the reactor 110, the hot-sand supplier 130, the heater 140, the multi-stage-cyclone mechanism 150 and the condenser 160 may be controlled based on the components of the hot gas H' analyzed by the gas analyzer 180.

Figure 7:
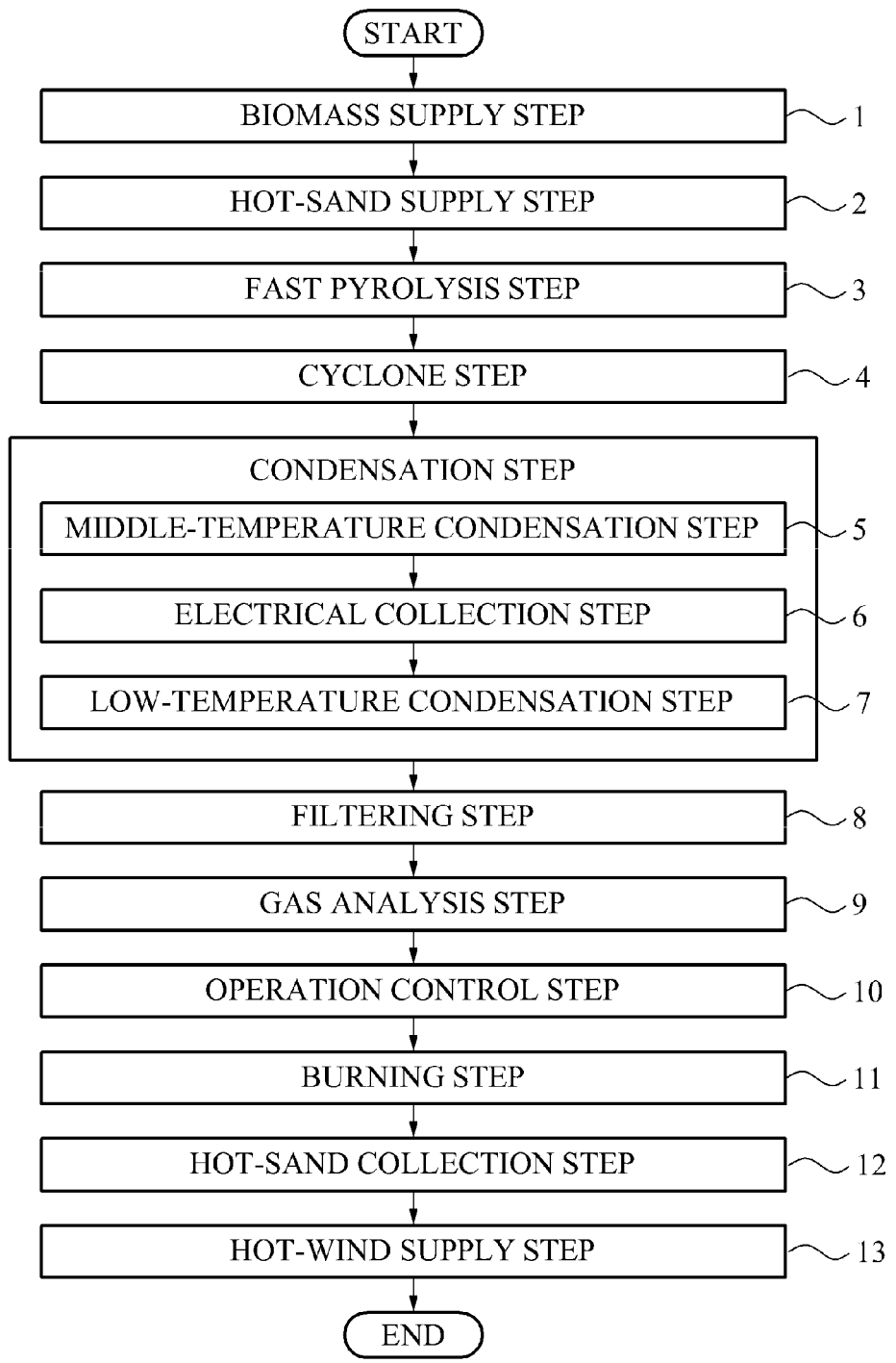
FIG. 7 is a flowchart illustrating a method for preparing bio-oil according to the embodiment of the present invention.

A method for preparing bio-oil using the system 100 according to the embodiment of the present invention will be described. FIG. 7 is a flowchart illustrating a method for preparing bio-oil according to the embodiment of the present invention.

Referring to FIG. 7, the method according to the embodiment of the present invention includes a biomass supply step (1), a hot-sand supply step (2), a fast pyrolysis step (3), a cyclone step (4), a condensation step (5, 6 and 7), a burning step (11), a hot-sand collection step (12) and a hot gas supply step (13).

In the biomass supply step (1), the biomass supplier 120 may supply biomass M to the inclined portion 111 of the reactor 110. In this case, the biomass supplier 120 continuously supplies lignocellulose biomasses M smashed to splinters to the upper portion of the inclined portion 111. Thus, the biomass M may be slidingly moved downward along the inclined portion 111 by gravity.

In the biomass supply step (1), the anti-clumping mechanism 122 is operated when the biomass M is supplied, thereby preventing the clumping of the biomass M. That is, if the driving portion 125 of the anti-clumping mechanism 122 is operated, it linearly reciprocates the rod portion 123 in a horizontal direction, and the projections 124 are linearly reciprocated together with the rod portion 123 in the horizontal direction. Thus, the projections 124 smashes the biomass M positioned at the discharge hole 110b of the biomass supplier 120, thereby enhancing the supply performance of the biomass M.

In the hot-sand supply step (2), the hot-sand supplier 130 may supply high-temperature hot sand S to the upper side of the biomass M disposed on the inclined portion 111. In this case, since the hot-sand supplier 130 continuously supplies the hot sand S on the upper side of the biomass M supplied to the upper portion of the inclined portion 111, the hot sand S can be slidingly moved, together with the biomass S, downward along the inclined portion 111 by gravity.

The hot-sand heater 140 provided to the hot-sand supplier 130 can constantly maintain the hot sand S at a second setting temperature. The second setting temperature is a temperature of the hot sand S at which the fast pyrolysis process of the biomass M is most actively promoted. Thus, the heat of the hot sand S applied to the biomass M is constant in the fast pyrolysis process of the biomass M. Accordingly, the fast pyrolysis process of the biomass M can be stably performed.

In the fast pyrolysis step (3), the heater 140 heats the inclined portion 111 at a first setting temperature by supplying hot gas H to the inclined portion 111. In this case, the hot gas H of the heater 140 may be supplied to the heat transfer portion 146 provided to the reactor 110. The hot gas H supplied to the heat transfer portion 146 can equally transfer heat to the entire inclined portion 111 while being flowed upward along the heat transfer portion 146. Thus, the hot gas H of the heater 140 and the heat of the hot sand S fast pyrolyze the biomass M moved downward along the inclined portion 111.

In the fast pyrolysis step (3), the biomass M may be fast pyrolyzed into gas G. The gas G produced in the fast pyrolysis step (3) contains components of the bio-oil, and is exhausted to the exterior of the reactor 110 through the gas outlet 112. Alternatively, char C produced as a byproduct in the fast pyrolysis step (3) is discharged together with hot sand S' to the conveyor mechanism 142 through the exit 110b of the reactor 110.

In addition, the fast pyrolysis process of the biomass M may be observed with the naked eye through the transparent windows of the reactor 110, and the reaction temperature in the reactor 111 in the fast pyrolysis of the biomass M may be observed through the temperature sensors 114. If the reaction temperature in the reactor 110 is lower than the first setting temperature necessary for the fast pyrolysis, the auxiliary heater 115 is operated together with the heater 140 to increase the reaction temperature in the reactor 110.

In the cyclone step (4), the multi-stage-cyclone mechanism 150 receives gas G generated in the fast pyrolysis process of the biomass M from the reactor 110 and removes a solid matter contained in the gas G. The multi-stage-cyclone mechanism 150 removes the solid matter in a particle stage, contained in the gas G, using several cyclone phenomena.

The char C in a micro-particle state, contained in the gas G, is representative of the solid matter removed in the cyclone step (4). This is because the char C in the micro-particle state has bad influence on the process of preparing the bio-oil, and therefore, the yield of the bio-oil is lowered.

In the condensation step (5, 6 and 7), the condenser 160 receives gas G1 obtained by removing the solid matter in the cyclone step (4) from the multi-stage-cyclone mechanism 150, and condenses the gas G1. That is, if the condenser 160 condenses the gas G1, the bio-oil is extracted from the gas G1. More specifically, the condensation step (5, 6 and 7) includes a mid-temperature condensation step (5), an electrical collection step (6) and a low-temperature condensation step (7).

That is, in the mid-temperature condensation step (5), the mid-temperature condenser 162 receives the gas G1 obtained by removing the solid matter in the cyclone step 4 from the multi-stage-cyclone mechanism 150, and condenses the gas G1 at a mid-temperature. If the mid-temperature condenser 162 condenses the gas G1 at the mid-temperature, the bio-oil is primarily extracted from the gas G1. In this case, the condensation temperature in the mid-temperature condensation step (5) is an ambient temperature, and the bio-oil extracted in the mid-temperature condensation step (5) contains a polymer material.

In the electrical collection step (6), the electrical collector 164 receives gas G2 that is not condensed in the mid-temperature condensation step (5) from the mid-temperature condenser 162 and electrically collects the gas G2. If the electrical collector 164 electrically collects the gas G2, the bio-oil in a droplet state, contained in the gas G2, is collected. Thus, in the electrical collection step (6), the bio-oil in the droplet state, which is not completely collected in the mid-temperature condensation step (5), is re-collected. Accordingly, the yield of the bio-oil can be enhanced.

In the low-temperature condensation step (7), the low-temperature condenser 166 receives gas G3 electrically collected in the electrical collection step (6) from the electrical collector 164 and condenses the gas G3 at a low temperature. If the low-temperature condenser 166 condenses the gas G3 at the low temperature, the bio-oil is secondarily extracted from the gas G3. In this case, the condensation temperature in the low-temperature condensation step (7) is around sub-zero temperatures, and the bio-oil extracted in the low-temperature condensation step (7) contains a low molecular material.

In the burning step (11), the heater 140 receives gas G4 that is not condensed in the condensation step (5, 6 and 7) and the char C and hot sand S' produced in the fast pyrolysis step (3) and burns the gas G4, the char C and the hot sand S' at a high temperature. That is, the gas G4 is supplied to the interior of the heater 140 from the condenser 160, and the char C and the hot sand S' are supplied to the interior of the heater 140 by the conveyor mechanism 142. Thus, in the burning step (11), the gas G4 and the char C can be completely burned, and the hot sand S' can be recycled at a high temperature.

In addition, in the burning step (11), heat generated from the heater 140 is transferred in the form of hot gas H to the fast pyrolysis step (3). The heater 140 preheats gas supplied from the exterior using waste heat H' exhausted to the exterior from the reactor 110 or the heat transfer portion 146. Thus, the burning efficiency of the heater 140 can be increased, and the operational cost can be reduced.

In the hot-sand collection step (12), the hot-sand supplier 130 receives high-temperature hot sand S recycled in the burning step (11) from the heater 140. The hot sand S collected to the hot-sand supplier 130 is re-used in the hot-sand supply step (2). Thus, the hot sand S is not wasted but continuously re-used. Accordingly, cost can be considerably reduced, and the hot sand S with a constant quality can be continuously used.

In the hot gas supply step 13, a portion of the hot gas H generated in the burning step (11) is supplied to the interior of the reactor 110 from the heater 140. The hot gas H may contain an inert combustion gas together with high-temperature heat. Therefore, the internal temperature of the reactor 110 may be increased by the hot gas H, and the internal pressure of the reactor 110 may be formed to be pressure greater than the atmospheric pressure by the hot gas H. In addition, a nonoxidizing atmosphere may be formed in the interior of the reactor 110 by the hot gas H.

If the internal pressure of the reactor 110 is higher than the atmospheric pressure, external air cannot be flowed into the interior of the reactor 110. Thus, it is possible to prevent the phenomenon that the external air and the biomass M are reacted with each other in the interior of the reactor 110. For this reason, it is less necessary to inject a separate inert gas, e.g., nitrogen gas, into the interior of the reactor 110. That is, a device for supplying an inert gas can be omitted, so that the cost and operational energy of the system 100 can be reduced. Since a high-priced inert gas is not used, the operational cost of the system 100 can be reduced.

If the interior of the reactor 110 is formed under the nonoxidizing atmosphere by the hot gas H, it is possible to prevent unnecessary oxidation of the biomass M in the fast pyrolysis process of the biomass M. Thus, all of the biomass M inserted into the reactor 110 can be used in the fast pyrolysis process of the biomass M. Accordingly, the yield of the bio-oil can be enhanced.

Referring to FIG. 7, the method according to the embodiment of the present invention may further include may include a post-processing step (8), a gas analysis step (9) and an operation control step (10).

In the post-processing step 8, the post-processing mechanism 170 receives hot gas H' exhausted to the exterior in the fast pyrolysis step (3) after the preheater 144 and post-processes the hot gas H'. That is, the post-processing mechanism 170 removes harmful objects contained in the hot gas H'. The hot gas H' obtained by removing the harmful objects may be exhausted to the exterior.

In the gas analysis step (9), the gas analyzer 180 analyzes components of the hot gas H' post-processed by the post-processing mechanism 170. It will be apparent that if necessary, the gases G, G1, G2, G3 and G4 respectively produced in all of the steps for preparing the bio-oil may be analyzed in the gas analysis step (9).

In the operation control step (10), the operation of at least one of the biomass supply step (1), the hot-sand supply step (2), the fast pyrolysis step (3), the cyclone step (4), the condensation step (5, 6 and 7) and the hot gas supply step 13 is controlled based on the components of the hot gas H', analyzed in the gas analysis step (9).

That is, if a change is detected in the components of gas G4 analyzed by the gas analyzer 180, it is determined that the process of preparing the bio-oil is abnormally performed. Therefore, operations of the steps for preparing the bio-oil are properly controlled.

Figure 8:
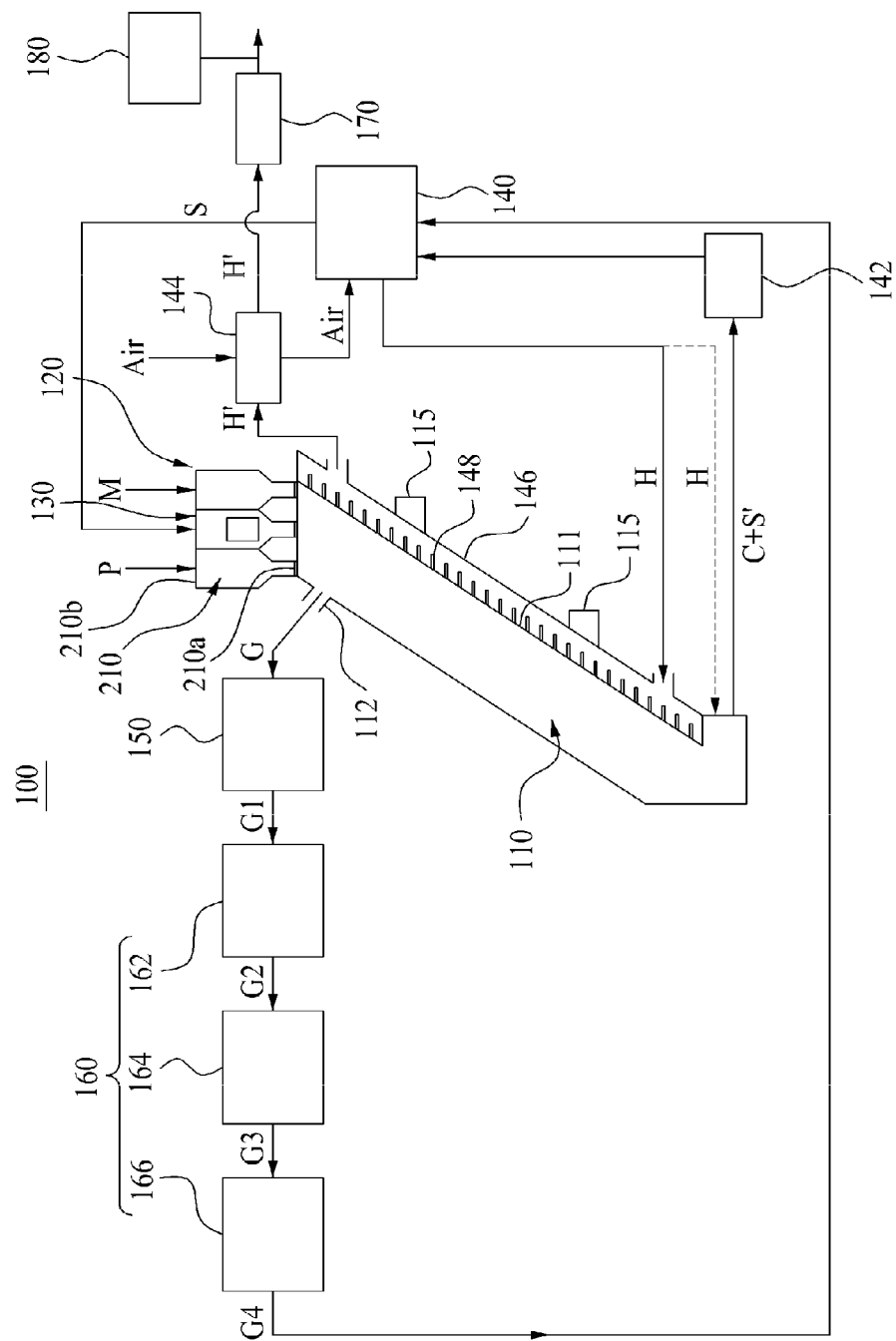
FIG. 8 is a configuration view schematically showing a system for preparing bio-oil according to another embodiment of the present invention.
Figure 9:
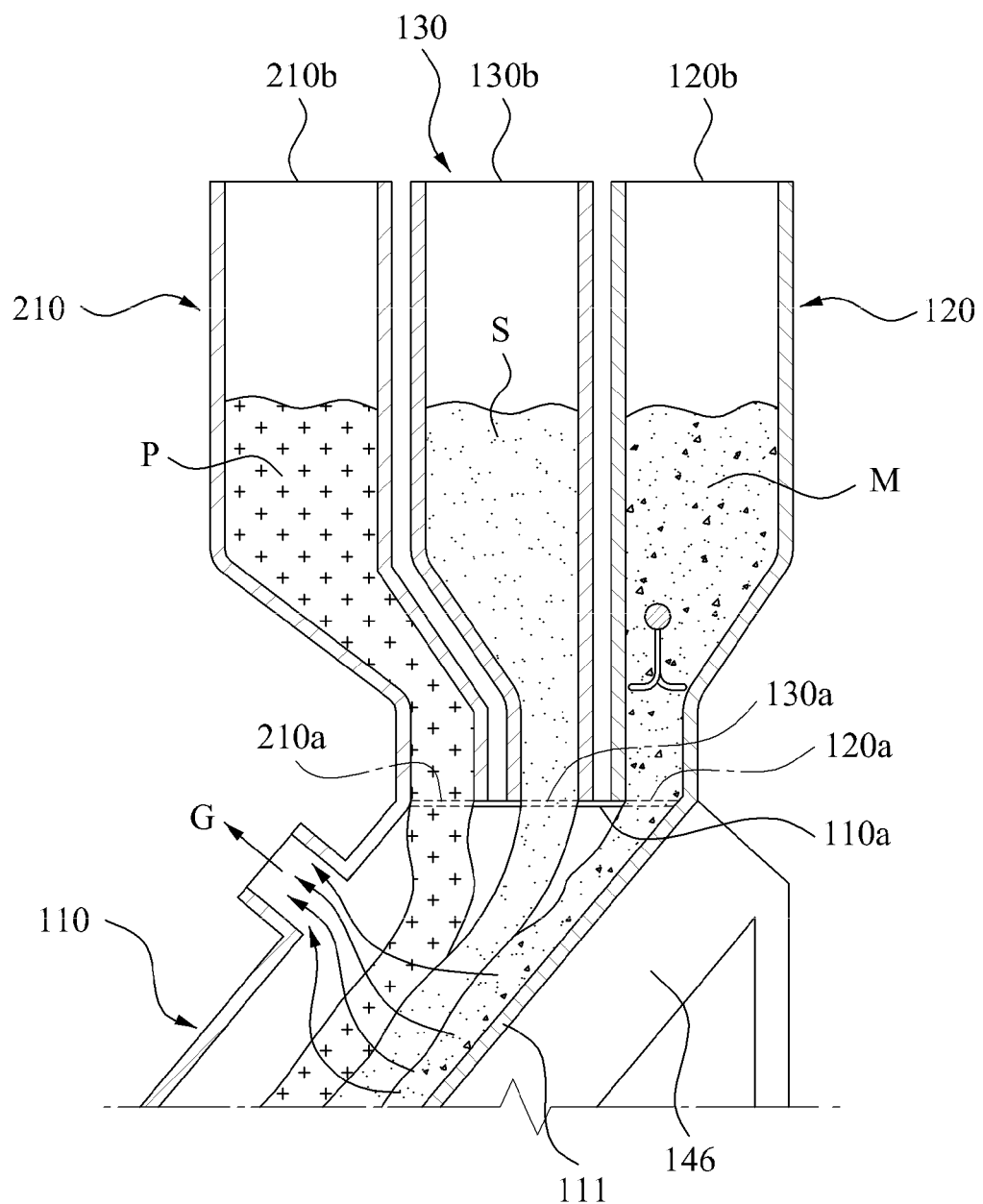
FIG. 9 is a view showing an operational state of the device according to the embodiment of the present invention.
Figure 10:
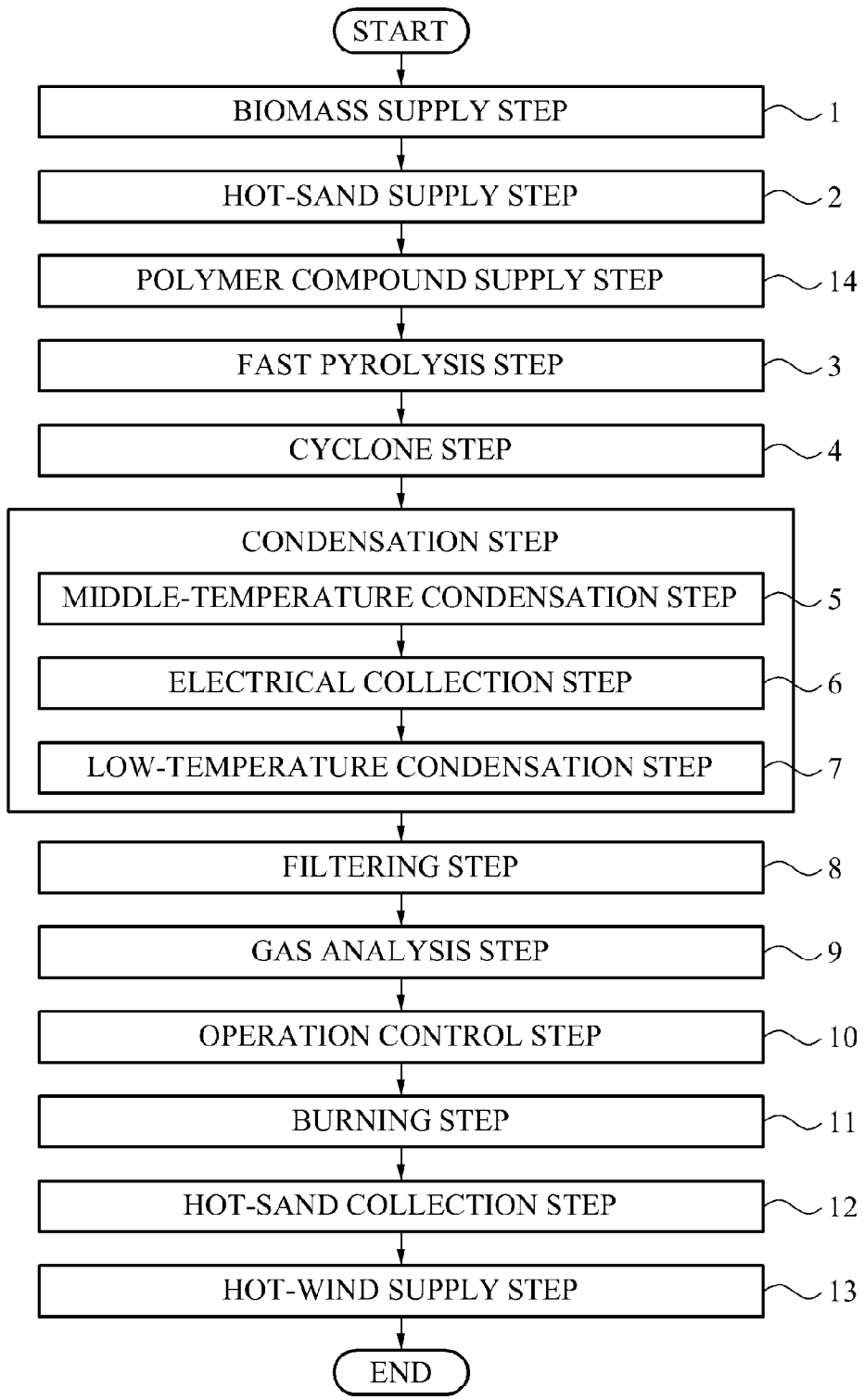
FIG. 10 is a flowchart illustrating a method for preparing bio-oil according to the embodiment.

FIG. 8 is a configuration view schematically showing a system for preparing bio-oil according to another embodiment of the present invention. FIG. 9 is a view showing an operational state of the device according to the embodiment of the present invention. FIG. 10 is a flowchart illustrating a method for preparing bio-oil according to the embodiment.

In FIGS. 8 to 10, reference numerals identical or similar to those shown in FIGS. 1 to 7 represent the same components or operational steps. Hereinafter, different points from the system 100 shown in FIGS. 1 to 7 will be described.

The system 200 shown in FIGS. 8 and 9 is different from the system 100 shown in FIGS. 1 to 7 in that a polymer compound supplier 210 is further provided to an upper portion of the reactor 110.

That is, the polymer compound supplier 210 may be provided, together with the biomass supplier 120 and the hot-sand supplier 130, to the upper portion of the reactor. The polymer compound supplier 210 is a device that supplies a polymer compound P to the biomass M and the hot sand S, supplied to the inclined portion 111 of the reactor. The polymer compound P may include waste plastic smashed to pieces.

An insertion hole 210b having the hot sand S inserted therethrough may be formed at an upper portion of the polymer compound supplier 210, and a discharge hole 210a may be formed at a lower portion of the polymer compound supplier 210. In this case, the discharge hole 210a is communicated with the entrance 110a of the reactor 110 to discharge the polymer compound P. At least one of the discharge hole 210a of the polymer compound supplier 210 and the entrance 110a of the reactor 110 may be formed to be opened/closed.

Referring to FIG. 10, the method using the system 200 is different from the method using the system 100, shown in FIG. 7, in that a polymer compound supply step (14) is provided between the hot-sand supply step (2) and the fast pyrolysis step (3).

That is, the polymer compound supply step (14) is performed after the biomass supply step (1) and the hot-sand supply step (2), and the polymer compound P is supplied to the biomass M and the hot sand S, supplied to the inclined portion 111 of the reactor 110. If the polymer compound P is supplied to the interior of the reactor 110, it is fast pyrolyzed together with the biomass M in the fast pyrolysis process of the biomass M. Accordingly, the yield and quality of the bio-oil can be enhanced.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. A device for preparing bio-oil, comprising:
a reactor configured to have an inclined portion formed to be inclined to at least one side portion thereof; a hot-sand supplier configured to be provided at one side of an upper portion of the reactor, and to supply high-temperature hot sand to an upper side of the biomass so that the biomass is disposed between the inclined portion and the hot-sand supplier; a biomass supplier configured to be provided at the other side of the upper portion of the reactor to face the hot-sand supplier, and to supply biomass to the inclined portion to move downward along the inclined portion; and
a heater configured to heat the inclined portion so as to fast pyrolysis the biomass and the hot sand, wherein the inclined portion of the reactor comprises a heat transfer portion that receives heat supplied from the heater and equally transfers the heat to the inclined portion, wherein the heater supplies high-temperature hot gas to the heat transfer portion, and the heat transfer portion is formed in the shape of a path along which the hot gas passes; and a hot gas inlet having the hot gas sucked through is formed at a lower portion of the heat transfer portion, and a hot gas outlet having the hot gas, heated by the inclined portion, exhausted through is formed at an upper portion of the heat transfer portion, wherein a heat transfer structure for enhancing the heat transfer performance with the hot gas is formed on at least one of the inclined portion of the reactor and the heat transfer portion, and wherein the heat transfer structure is a plurality of protrusions protruding from the inclined portion of the reactor or the heat transfer portion.

2. The device of claim 1, wherein the reactor is provided with at least one temperature sensor for sensing the internal temperature in the fast pyrolysis process of the biomass.

3. The device of claim 1, wherein an auxiliary heater that controls the reaction temperature of the biomass by heating the inclined portion is provided to the inclined portion of the reactor.

4. The device of claim 1, wherein the hot-sand supplier is provided with a hot-sand heater that controls the temperature of the hot sand by heating the hot sand.

5. A system for preparing bio-oil, comprising:
a reactor configured to have an inclined portion formed to be inclined to at least one side portion thereof, wherein along the inclined portion, biomass is moved downward,
a hot-sand supplier configured to be provided at one side of an upper portion of the reactor, and to supply high-temperature hot sand to an upper side of the biomass so that the biomass is disposed between the inclined portion and the hot-sand supplier;
a heater configured to heat the inclined portion so as to fast pyrolyze the biomass and the hot sand;
a cyclone mechanism configured to receive gas produced in the interior of the reactor and to remove a solid matter contained in the gas;
a condenser configured to condense the gas obtained by removing the solid matter in the cyclone mechanism, and thereby producing bio-oil; and
a preheater configured to preheat external air supplied to the heater using waste heat exhausted from the reactor,
wherein the inclined portion of the reactor comprises a heat transfer portion that receives heat supplied from the heater and equally transfers the heat to the inclined portion,
wherein the heater supplies high-temperature hot gas to the heat transfer portion, and the heat transfer portion is formed in the shape of a path along which the hot gas passes; and a hot gas inlet having the hot gas sucked through is formed at a lower portion of the heat transfer portion, and a hot gas outlet having the hot gas, heated by the inclined portion, exhausted through is formed at an upper portion of the heat transfer portion,
wherein a heat transfer structure for enhancing the heat transfer performance with the hot gas is formed on at least one of the inclined portion of the reactor and the heat transfer portion, and
wherein the heat transfer structure is a plurality of protrusions protruding from the inclined portion of the reactor or the heat transfer portion.

6. The system of claim 5, wherein:
the heater burns gas that is not condensed in the condenser and char and hot sand that is discharged from the reactor;
the hot-sand supplier receives the hot sand heated from the heater.

* * * * *